Jan. 27, 1959
L. D. COBB
2,870,890
ONE-WAY CLUTCH
Filed Feb. 18, 1954
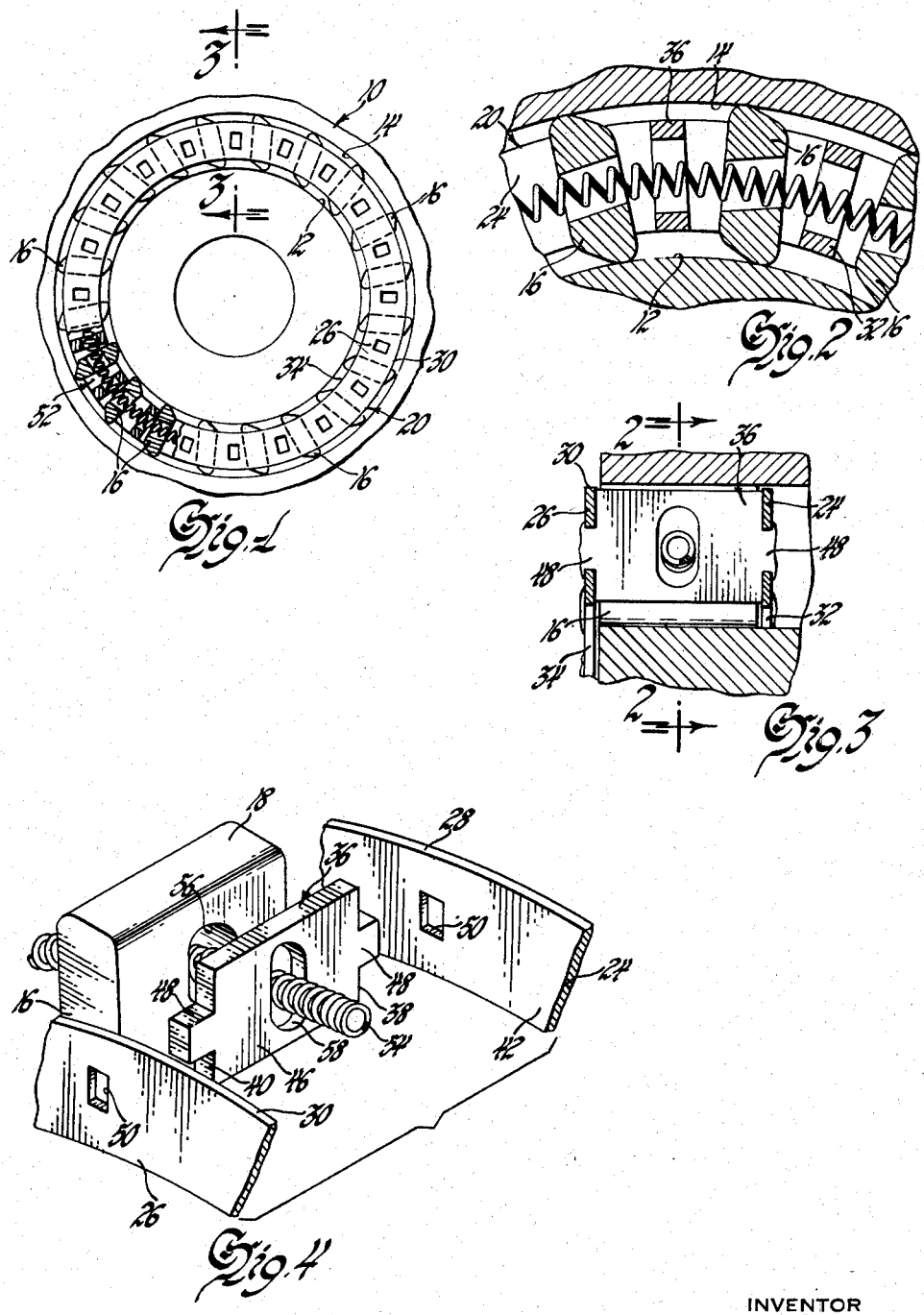
INVENTOR
Leland D. Cobb
BY
Edward H. Goodrich
ATTORNEY

United States Patent Office 2,870,890
Patented Jan. 27, 1959

2,870,890

ONE-WAY CLUTCH

Leland D. Cobb, Forestville, Conn., assignor to General Motors Corporation, Detroit, Mich., a corporation of Delaware Application February 18, 1954, Serial No. 412,754

1 Claim. (Cl. 192—45.1)

The present invention relates to one way clutches which employ a plurality of so-called "sprags" or tiltable grippers and more particularly to cage means for retaining the sprags in sliding engagement with a pair of relatively rotatable concentric races.

In one way clutches in which a plurality of sprags or tiltable grippers are disposed between relatively rotatable inner and outer races having substantially concentric cylindrical surfaces, it is desirable that the sprags be circumferentially positioned at substantially uniform intervals in the space between the races. It is therefore desirable to employ cage means that are disposed between the races to retain the sprags properly positioned. Heretofore, the cages employed have required expensive tools to manufacture them and when a large assortment of one way clutches are manufactured for use between races of different sizes, the tooling costs for the cages make the clutches very expensive.

It is now proposed to provide a cage which is not only simple and economical to manufacture but is also reliable in operation. This may be accomplished by employing a cage having a pair of substantially identical end rings which are held in parallel spaced relation normal to the axis of rotation by means of rigid cross bars that extend axially therebetween. The end rings may be substantially planar washer shaped members which are easily manufactured in any size suitable for the races with which the clutch is to be employed. The cross bars may be made in standard lengths for several different sizes of cages or they may be economically cut to any length that is suitable for use with the races to be employed.

During the operation of sprag clutches having cages, there are frequently abnormally large stresses imposed upon the cage, particularly during the times that the sprags move into and out of wedging engagement with the races. Due to the construction of the cages employed heretofore, they frequently are unable to withstand the forces imposed on them and they are either permanently deformed or broken thus resulting in premature clutch failures.

It is now proposed to provide a sprag clutch cage having a rigid design which will permit the cage to be of light weight and yet strong enough to withstand the excessively large loads imposed thereon. This is to be accomplished by employing a pair of end rings which are disposed normal to the axis of rotation and have parallel radial faces. A plurality of preferably solid cross bars may be disposed between the end rings so as to be parallel to the axis of rotation. The cross bars may have planar body portions disposed radially about the axis of rotation with ends thereof adapted to abut against the radial faces on the end rings and thus prevent the end rings becoming oblique to the axis of rotation. The ends of the cross bars may have integral projections thereon which with rectangular cross sections are positioned to project through rectangular openings in the end rings. The projections may be staked or riveted to the cage and thus prevent the cross bars becoming twisted out of radial alignment.

In order to provide a unit handling sprag clutch which will remain in one piece even when it is not retained in position between a pair of concentric races, it is proposed to provide a cage having cross bars with openings therethrough which are adapted to receive an annular spring. The spring extends through similar registering openings through the sprags so as to resiliently bias the sprags into position against the races. Since the spring is a continuous member which extends through openings in the cross bars and the sprags, it is apparent that the clutch will be a self-contained unit at all times.

In the one sheet of drawings:

Fig. 1 is a side view of a one way clutch employing the present invention.

Fig. 2 is a cross sectional view of the clutch of Fig. 1 taken substantially along the plane of line 2—2 in Fig 3.

Fig. 3 is a cross sectional view taken substantially along the plane of line 3—3 in Fig. 1.

Fig. 4 is an exploded perspective view showing a portion of the clutch in Fig. 1.

Referring to the drawing in more detail, the present invention may be embodied in any suitable one way clutch 10 adapted to be disposed between a substantially cylindrical inner race 12 and a substantially cylindrical outer race 14 that is in spaced concentric relation therewith. In the present instance the clutch 10 is of the so-called "sprag" type which includes a plurality of substantially identical tiltable grippers or sprags 16 that are adapted to be disposed in circumferentially spaced relation between the inner 12 and outer 14 races. Each of the sprags 16 are disposed in an almost radial position so that the inner and outer ends which may have cam surfaces 18 thereon are positioned to engage the races 12 and 14. The cam surfaces 18 are disposed so that one diagonal of the sprags 16 is longer than the other diagonal and larger than the space between the two races 12 and 14. The cam surfaces 18 are adapted to be held in engagement with the races 12 or 14 so that when the outer race 14 rotates counterclockwise relative to the inner race 12, the cam surfaces 18 will merely slide on the races but when the outer race 14 rotates clockwise relative to the inner race 12, the sprags 16 will rotate so that the longer diagonal is more nearly radial and the sprag 16 is wedged between the inner and outer races 12 and 14. Thus when the outer race 14 rotates counterclockwise relative to the inner race 12, it will overrun the inner race 12, but when it rotates clockwise relative thereto, the sprags 16 will be in a wedged position so as to transmit torque from one race to the other.

In order to retain the sprags 16 positioned at substantially uniform circumferential intervals, a cage 20 may be disposed between the races 12 and 14. The cage 20 may be a rigid structure which includes a pair of end rings 24 and 26 that are substantially identical planar members having a washer shape. The periphery 28 and 30 of each ring 24 and 26 is preferably circular and has a diameter smaller than that of the outer race 14. The center of each ring 24 and 26 may be provided with a circular opening 32 and 34 having a diameter larger than the diameter of the inner race 12. It is thus apparent that the rings 24 and 26 may be disposed between the races 12 and 14 substantially normal to the axis of rotation and in spaced relation to each of the races.

In order to retain the end rings 24 and 26 in parallel spaced relation, a plurality of substantially identical cross bars 36 may be disposed axially between the rings 24 and 26 so that the opposite ends 38 and 40 thereof engage the inner faces 42 of the rings 24 and 26. Each cross bar 36 which may be disposed between adjacent pairs of sprags 16 comprises a single rigid member having a substantially planar body portion 46 disposed in radial planes between the end rings 24 and 26. The opposite ends 38 and 40 of the cross bars 36 may be substantially parallel to each other and adapted to abut against the inner faces 42 across the entire width of the rings 24 and 26. In order to secure the rings 24 and 26 to the cross bars 36, a projection 48 integral with the body portion 46 may project from the opposite ends of the cross bars 36. These projections 48 are preferably the same thickness as the cross bars 36 and rectangular in cross section. They may be adapted to project through rectangular openings 50 in the end rings 24 and 26 so as to be riveted or staked thereto and thus be permanently secured to the end rings. It should be noted that since the opposite ends 38 and 40 of the cross bars 36 are parallel and bear on substantially the entire width of the end rings 24 and 26, the end rings 24 and 26 will be prevented from becoming askew with respect to each other and/or the axis of rotation. It may also be noted that since the end projections 48 are rectangular and are disposed in rectangular openings 50, it will be extremely difficult, if not impossible, for the cross bars 36 to become radially misaligned. It is therefore apparent that a very rigid cage 20 has been provided which will withstand the severe forces to which it will be subjected during locking engagement of the sprags 16 and races 12 and 14.

In order to insure the sprags 16 moving into or out of wedging or locking engagement with the races 12 and 14, as soon as the races reverse their direction of rotation, it is desirable that the cam surfaces 18 on the sprags 16 always engage the races 12 and 14. Accordingly, any suitable spring means 52 may be provided for resiliently biasing the sprags 16 so that the cam surfaces 18 on the ends thereof will engage the races 12 and 14. In the present instance it has been found desirable to employ a coil spring 54 which has the opopsite ends thereof secured together to form an unbroken annulus or so-called "garter" spring. The spring 54 may extend through openings 56 which are positioned in the sprags 16 at such an angle as to rotate the sprags 16 and bias the cam surfaces 18 against the races 12 and 14. Thus the cam surfaces 18 will always be in engagement with the races 12 and 14. In addition, the spring 54 may extend through openings 58 in the cross bars 36. The openings 58 in the cross bars 36 may be positioned to register with the openings 56 in the sprags 16 disposed on the opposite sides thereof. It will thus be seen that since the spring 54 is threaded through the registering openings 56 and 58 in the sprags 16 and cross bars 36, all of the sprags 16 will be secured into a unitary structure which will not come apart even when the clutch 10 is not disposed between the races.

It is to be understood that, although the invention has been described with specific reference to a particular embodiment thereof, it is not to be so limited since changes and alterations therein may be made which are within the full intended scope of this invention as defined by the appended claim.

What I claim is:

A one way clutch for use between a pair of relatively rotatable coaxial races comprising an annular cage adapted to be positioned between and radially spaced from said races, the cage having a pair of substantially identical end rings and a plurality of axially extending flat cross bars disposed between said end rings, said end rings having adjacent planar faces disposed normal to said axis, said cross bars having radially disposed body portions with the ends thereof fitting against said end rings across substantially the entire radial width of each end ring, said ends having reduced portions with rectangular cross sections fitted within and extending through rectangular openings in said end rings, the outer ends of the reduced portions being headed over, sprags disposed between adjacent pairs of said cross bars for wedging engagement with said races, said sprags and adjacent cross bars having registering openings therethrough and annular spring means extending through said registering openings and supporting the cage in radially spaced relation to both of said races.

References Cited in the file of this patent

UNITED STATES PATENTS

| | | |
|---|---|---|
| 2,366,842 | Dodge et al. | Jan. 9, 1945 |
| 2,366,843 | Dodge et al. | Jan. 9, 1945 |
| 2,520,004 | Gondek | Aug. 22, 1950 |
| 2,599,793 | Warner | June 10, 1952 |
| 2,677,448 | Gillespie | May 4, 1954 |
| 2,677,449 | Wavak | May 4, 1954 |
| 2,724,472 | Swenson | Nov. 22, 1955 |